(12) United States Patent
Høydal et al.

(10) Patent No.: US 9,901,847 B2
(45) Date of Patent: Feb. 27, 2018

(54) METHOD AND SYSTEM FOR FLUID SEPARATION WITH AN INTEGRATED CONTROL SYSTEM

(75) Inventors: Jan Høydal, Stavanger (NO); Olav Kristiansen, Trondheim (NO); Gisle Otto Eikrem, Stjørdal (NO); Kjetil Fjalestad, Skien (NO)

(73) Assignee: STATOIL PETROLEUM AS, Stavanger (NO)

( * ) Notice: Subject to any disclaimer, the term of this patent is extended or adjusted under 35 U.S.C. 154(b) by 87 days.

(21) Appl. No.: 14/367,617

(22) PCT Filed: Dec. 22, 2011

(86) PCT No.: PCT/EP2011/073881
§ 371 (c)(1),
(2), (4) Date: Jul. 2, 2014

(87) PCT Pub. No.: WO2013/091719
PCT Pub. Date: Jun. 27, 2013

(65) Prior Publication Data
US 2015/0290560 A1    Oct. 15, 2015

(51) Int. Cl.
*B01D 45/00* (2006.01)
*B01D 19/00* (2006.01)
(Continued)

(52) U.S. Cl.
CPC ..... *B01D 19/0063* (2013.01); *B01D 19/0042* (2013.01); *B01D 45/12* (2013.01); *B04C 11/00* (2013.01)

(58) Field of Classification Search
None
See application file for complete search history.

(56) References Cited

U.S. PATENT DOCUMENTS 4,766,001 A * 8/1988 Mizandjian ........ B01D 19/0005
261/36.1
5,158,585 A * 10/1992 Saho .................. B01D 46/0009
55/338
(Continued)

FOREIGN PATENT DOCUMENTS

EP          1 600 215 A1    11/2005
WO      WO 01/00296 A1     1/2001
(Continued)

*Primary Examiner* — Dung H Bui
(74) *Attorney, Agent, or Firm* — Birch, Stewart, Kolasch & Birch, LLP

(57) ABSTRACT

A system for separating an input fluid flow comprising gas and liquid into separate gas and liquid flows is provided. The system includes a primary separator configured to receive the input fluid flow and to separate the input fluid flow into a primary separator liquid output flow and a primary separator gas output flow, a first secondary inline separator connected downstream from the primary separator to polish the primary separator gas output flow, a second secondary inline separator connected downstream from the primary separator to polish the primary separator liquid output flow, a system gas outlet, a system liquid outlet, a primary separator gas output valve on the primary separator gas output flow, and a control system configured to receive measurements of liquid level within the primary separator, and identify, using the received measurements, whether a position of the primary separator gas output valve is to be changed.

30 Claims, 8 Drawing Sheets

(51) Int. Cl.
*B01D 45/12* (2006.01)
*B04C 11/00* (2006.01)

(56) References Cited

U.S. PATENT DOCUMENTS

| | | | | |
|---|---|---|---|---|
| 6,752,845 B2* | 6/2004 | Haland | ............... | B01D 45/16 55/340 |
| 6,981,997 B2* | 1/2006 | Williams | ........... | B01D 19/0005 426/475 |
| 2004/0045432 A1* | 3/2004 | Yamamoto | ............. | B01D 53/22 95/48 |
| 2011/0203460 A1* | 8/2011 | Skofteland | .............. | E21B 43/36 96/408 |

FOREIGN PATENT DOCUMENTS

| | | |
|---|---|---|
| WO | WO 01/67189 A1 | 9/2001 |
| WO | WO 01/83075 A1 | 11/2001 |
| WO | WO 02/46577 A1 | 6/2002 |
| WO | WO 02/056999 A1 | 7/2002 |
| WO | WO 2004/000438 A1 | 12/2003 |
| WO | WO 2004/073829 A1 | 9/2004 |
| WO | WO 2004/080566 A1 | 9/2004 |
| WO | WO 2006/085759 A1 | 8/2006 |
| WO | WO 2007/102079 A1 | 9/2007 |
| WO | WO 2008/032201 A2 | 3/2008 |
| WO | WO 2008/115074 A2 | 9/2008 |
| WO | WO 2009/099339 A1 | 8/2009 |
| WO | WO 2009/108063 A1 | 9/2009 |

* cited by examiner

METHOD AND SYSTEM FOR FLUID SEPARATION WITH AN INTEGRATED CONTROL SYSTEM

FIELD OF THE INVENTION

The present invention consists of inline fluid separators and a process control system developed for an integrated separation process.

BACKGROUND

When extracting hydrocarbons (oil and gas), the extracted fluid is a mixture of liquid and gas. Typically, the extracted fluid has perhaps 30% liquid and 70% gas (of the volume). However, these proportions are not constant. Furthermore, there may be intermittent bursts or pulses which are almost 100% liquid (known as slugs). These variations in flow cause difficulties in transporting the extracted fluid (e.g. from the extraction point which may be offshore to a delivery point which may be onshore and may be a long way away).

Traditionally separation devices in the form of containers have been used to provide the separation of the multiphase flow. If there is a danger of liquid slugs the container volume must be sufficiently large in order to handle a liquid slug. Such containers are often large and heavy and must be constructed in accordance to design codes for pressure containers. The present applicant has recognised that it would be preferable to provide an inline solution which is built according to pipe code. Pipe and tank codes are concerned with standards and rules for building objects which withstand pressure and the standards and maintenance requirements are different for the same pressure.

A compact degasser (phase splitter) which is designed to fit within a pipe is proposed in WO01/00296. The apparatus separates fluid flow through a pipeline into a heavier and a lighter fraction and is illustrated in FIG. 1a. The apparatus 1a comprises a casing 2a which is connectable within a pipeline (not shown). There is an inlet 3a which receives the multiphase flow, a liquid outlet 4a and a gas outlet 14a. At the upstream end of the casing, there is an axial spin element 5a which rotates and sets the multiphase flow into rotation. The spin element comprises a core body 8a on which there are mounted a number of axially curved guide blades 9a. Upstream of the spin element, there is a guide body 10a supported centrally in the casing by a supporting means 11a.

The gas is separated into a central zone 6a with the liquid in an annular outer zone 7a. Gas and possibly entrained liquid is discharged through entrance openings 13a in a discharge element 12a. Downstream of the openings 13a is a reflector element 15a and an anti-spin element 16a to bring the rotating liquid phase flow back to an axially directed flow through outlet 4a. The anti-spin element 16a comprises a core body 17a on which there are mounted a plurality of guide blades 18a. There are transfer cones 19a and 20a within the system and a flow restriction 21a at the liquid outlet.

As set out in WO2004/080566 there is a problem with the compact degasser shown in WO01/00296 in that it exhibits problems with slow response, reduce degree of separation and tendency of flooding with liquid. The solution proposed in WO2004/080566 is to provide a control system and a downstream compact multiphase inlet separator with the aim of avoiding gas passage out from the liquid outlet. This is achieved by holding a sufficient liquid volume in the multiphase inlet separator such that a valve in the liquid outlet must be closed before gas is allowed to flow.

An alternative compact separator which is designed to fit within a pipe is a compact deliquidiser as described in WO2002/056999. The apparatus is designed to separate liquid from a multiphase flow and is shown in FIG. 1b. The apparatus comprises a casing 1b which is connectable within a pipeline (not shown). There is an inlet 2b which receives the multiphase flow, a liquid outlet 24b and a gas outlet 3b. In the inlet, there is an axial spin element 4b having an end part 8b with annular lips 9b. The element rotates and sets the multiphase flow into rotation. The gas is separated into a central zone 5b with the liquid in an annular outer zone 6b. There is a gas outlet element 10b having a cylindrical portion 13a which has a central passage 11b connected to the gas outlet and which defines an annulus 12b for liquid flow. The element 10b also has a divergent portion 14b which fits snugly within the casing to form a barrier 15b for water. Water drains into a container 16b at the downstream end of the casing and is drawn out through outlet 24b.

The upper portion of the container 16b is connected to a central cavity 18b of the spin element 4b by a gas recirculation line 17b. A valve 20b controls flow on the line 17b.

The spin element 4b has opening 19b for discharge of the recirculated gas. A partition 21b is provided to prevent liquid getting into the gas recirculation line 17b. The bottom 23b of the container 16b is connected to the liquid outlet 24b with a valve 25b which is connected to a gauge 27b and control unit 26b to control flow. There is an anti-spin element 22b in the gas outlet.

Slugs are a particular problem for the compact deliquidiser of WO 2002/056999. The problem of slug inhibition is addressed in WO2004/073829, which proposes the compact cyclone based deliquidizer of WO 2002/056999 with a downstream multiphase inlet separator. In normal operation, the deliquidizer receives a mixed phase flow which contains little liquid and both the liquid and gas from the deliquidizer can flow to the inlet separator. However, if it is detected that liquid is entrained in the gas flow from the deliquidizer, the liquid drain from the deliquidizer bypasses the inlet separator. In this way, the inlet separator is arranged to collect liquid when the draining capacity of the deliquidizer is exceeded.

In both WO2004/073829 and WO2004/080566, the inlet separator is described as being smaller than downstream arranged equipment but must nevertheless have a volume which is such that the volume provides desired residence time for received liquid. Such inlet separators are typically vessel separators. Accordingly, the systems are not compact inline systems.

Other individual compact separators are known from WO2004/000438 to Statoil ASA, EP1600215 to Flash Technologies NV, WO2006/085759 to Flash Technologies NV and WO2009/099339 to Statoil ASA.

A system comprising multiple inline separators is described in WO2009/108063. WO2008/115074 teaches an arrangement having multiple separators which perform gravitational separation. The system is designed and installed according to pipe codes instead of tank (container codes).

Control systems for controlling one or more valves within a system are described in WO2002/046577, WO2007/102079 and WO2008/032201 to ABB and WO01/67189 to Borealis Technology Oy.

The applicant has recognised the need for an improved inline system.

SUMMARY OF THE INVENTION

According to a first aspect of the invention, there is provided a system for separating an input fluid flow comprising gas and liquid into separate gas and liquid flows, the system comprising:
- a primary inline separator configured to receive said input fluid flow and to separate said input fluid flow into a primary separator liquid output flow and a primary separator gas output flow;
- at least one secondary inline separator connected downstream from said primary inline separator to receive at least one of said primary separator output flows and to separate said received primary separator output flow into a secondary separator liquid output flow and a secondary separator gas output flow;
- a gas outlet connected to at least one of said primary and secondary separators to output said respective gas output flow;
- a liquid outlet connected to at least one of said primary and secondary separators to output said respective liquid output flow; and
- a control system configured to regulate flow through said primary and secondary separators to ensure a flow of gas from said gas output with a maximum amount of liquid carry-over and a flow of liquid from said liquid outlet with a maximum amount of entrained gas.

According to another aspect of the invention, there is provided a method for controlling a system as described above, the method comprising regulating flow through said primary and secondary separators to ensure a positive flow of gas from said gas output with a specified amount of liquid carry-over and a positive flow of liquid from said liquid outlet with a maximum amount of entrained gas.

The following features apply to both aspects of the invention.

By inline, it is meant that both separators are housed within pipes for transmitting the fluid flows. Thus, the separators are preferably lightweight and have a small footprint. The maximum amount of liquid carry-over is preferably such that said gas output flow is at a quality suitable for compression using a gas compressor (including a wet gas compressor) or for free transport in a gas pipeline or riser. The maximum amount of entrained gas is preferably sufficiently low that the liquid output flow can be pumped by a conventional liquid (low gas content) pump or a hybrid (gas tolerant) pump. Each of the first and second separator gas output flows are output flows which may contain a mixture of gas and liquid but have a greater proportion of gas than liquid. Similarly, each of the first and second separator liquid output flows are output flows which may contain a mixture of gas and liquid with a greater proportion of liquid than gas.

The control system is preferably sufficiently fast and accurate to ensure stable and robust operation in all conditions, including stable and transient flows. Said control system may thus be configured to regulate the separator system such as to dampen transient input fluid flows and ensure a positive flow of gas from said gas output and a positive flow of liquid from said liquid output. The positive flow of the gas and/or liquid is preferably a constant flow. Such transient input fluid flows may include flows at start-up or shut-down and flows including slugs. In particular, the control system may be configured to control the quality and/or quantity of flow in the primary separator liquid output flow and the primary separator gas output flow.

Said control system may thus be configured to determine whether said input fluid flow is above a threshold value, e.g. 40% of the full capacity of the system and to regulate flow through the system according to said determination. If said input fluid flow is above said threshold, the control system regulates flow through the system so that the primary inline separator primarily functions as a pre-separation stage and a slug damper. If said input fluid flow is below said threshold, e.g. during start-up and at other low production rates, the control system regulates flow through the system so said primary separator liquid output flow has less than said maximum amount of entrained gas and said primary separator gas output flow meets said specified amount of liquid carry-over. In other words, said primary inline separator is acting as a stand-alone separator with the same quality requirements for the outlet streams as for the full system.

Said system may further comprise a pump downstream from the liquid outlet and may further comprise a minimum flow pipe line connected from downstream from the pump to a location upstream from the pump. The minimum flow pipe line may be connected to a location downstream from the pump, to a location within the system (e.g. between the primary and secondary separators) or to a location upstream from the primary separator.

Said system may further comprise a compressor downstream from said gas outlet and an anti-surge pipe line connected from downstream from the compressor to a location upstream from the compressor. The anti-surge pipe line may be connected to a location immediately upstream from the compressor, to a location within the system (e.g. between the primary and secondary separators) or to a location upstream from the primary separator.

Said primary separator may be a cyclonic separator, e.g. a GLCC. Such a separator may be configured to have three modes of operation. In a first normal mode of operation, the separator may act as a cyclonic separator and flow conditioner. In a second mode of operation, when said input fluid flow is below a first threshold value, said first separator may act as a stand-alone cyclonic separator and flow conditioner.

Said first threshold value may be a turndown value and may be when the flow is less than approximately 40% of the normal flow. In a third mode of operation, when said input fluid flow is below a second lower threshold value, said primary separator may act as a vertical gravity separator. Said second threshold value is lower than said first threshold value and may be a very low flow rate, e.g. where the cyclonic spin breaks down.

Accordingly, said primary separator may itself be configured to control the quality and/or quantity of flow in the first primary separator liquid output flow and/or the primary separator gas output flow. This may be achieved by the configuration of the primary separator alone or the combination of the configurations of the primary and secondary separator(s). The configuration, i.e. physical properties, of the separators are thus an important part of the control process which co-operates with the control system to achieve the desired outputs.

Said at least one secondary separator may be a secondary gas separator connected to said primary separator to receive and polish said primary separator gas output flow to remove liquid therefrom. In this arrangement, the secondary separator may be configured to receive the primary separator gas flow, for example if further polishing is required to meet the required standard. The secondary separator liquid flow may be recycled as an input to the primary separator. A pressure source may then be needed on the secondary separator liquid flow. Alternatively the secondary separator liquid flow may be combined with the primary separator liquid flow.

Alternatively, said at least one secondary separator may be a secondary liquid separator connected to said primary separator to receive and polish said primary separator liquid flow to remove gas therefrom. In this arrangement, the secondary separator may be configured to receive the primary separator liquid flow, for example if further polishing is required to meet the required standard.

Alternatively, there may be two secondary separators, e.g. a secondary gas separator and a secondary liquid separator. Where there are two secondary separators, both secondary separators may be connected to the appropriate output from said primary separator. Thus, said secondary gas separator may be connected to said primary separator to receive and polish said primary separator gas flow and said secondary liquid separator may be connected to said primary separator to receive and polish said primary separator liquid flow. Additionally, said secondary separators may be connected to receive the appropriate output from the other secondary separator. Thus, the secondary gas separator may be connected to both the primary separator and the secondary liquid separator to receive and polish the primary separator gas output flow and the secondary liquid separator gas output flow. The secondary liquid separator may be connected to both the primary separator and the secondary gas separator to receive and polish the primary separator liquid output flow and the secondary gas separator liquid output flow. In this arrangment, the system may further comprise a pressure source on the secondary gas separator liquid output flow.

Said secondary gas separator may have a retention time in the range of a fraction of a second to a few seconds. In this arrangement, said gas outlet may be connected to said secondary gas separator. The primary separator and the liquid secondary separator are preferably configured to start producing liquid carry over as fluid input rates increase. Usually, the higher the rate, the larger amount of carry out by the separators. When said input fluid flow is above a threshold rate, said secondary gas separator becomes more efficient (because the G forces increase) and will remove the liquid carry over produced by the primary inline separator. The primary inline separator is thus primarily functioning as a pre-separation stage. In this way, the secondary gas separator is providing a gas output which meets the requirement of the system. When said input fluid flow is below said threshold and said primary inline separator is preferably configured to act as a stand-alone separator. In this case, the primary separator is providing gas output which meets the requirement of the system and the secondary gas separator is acting as a pipe. The secondary gas separator effectively does not work because of low cyclonic forces.

Where there are two secondary separators, said secondary liquid separator may be a "phase-splitter" or de-gasser. Said secondary gas separator may be a "de-liquidiser".

Where there is only one secondary separator, the primary separator must provide at least one output flow which meets the requirements of the system. For example, the primary separator may provide sufficient liquid quality output, e.g. a GLCC, and the secondary separator may be secondary gas separator, e.g. a de-liquidiser. Alternatively, primary separator may provide sufficient gas quality output, e.g. a de-liquidiser, and the secondary separator may be secondary liquid separator, e.g. a phase splitter.

Said system may further comprises a plurality of valves which are manipulated by said control system to regulate at least one of said separators' outlet fluid flows, enabling proper separation for each separator and suitable separation conditions for the said secondary separator(s). The flow rates include said liquid output flow from said primary separator liquid outlet, said gas output flow from said gas outlet, said flow from said primary separator to said secondary separator and flow from one or both of said primary and secondary separators to said liquid or gas outlet. Said plurality of valves may be controlled based on measurements of a plurality of state variables of the system, e.g. to maintain the pressure balance and any liquid levels.

Said plurality of valves may include one or more of a primary separator gas outlet valve for controlling said primary separator gas output flow and a secondary separator gas outlet valve for controlling said secondary separator gas output flow. Said plurality of valves may include one or more of a secondary separator liquid outlet valve for controlling said secondary separator liquid output flow and a secondary separator liquid outlet valve for controlling said secondary separator liquid output flow. Where there are two secondary separators connected to each other via an internal connector, said plurality of valves may include an internal valve for controlling flow within said internal connector.

The steps for regulating flow may comprise measuring a plurality of state variables of the system; identifying, using at least one measured state variable, at least one parameter to be changed, whereby changing said at least one parameter regulates said flow. Said identifying step may comprise determining whether said measured state variables are within an acceptable range for said state variable. Alternatively, said identifying step may comprise modelling said system using a function of one or more measured state variables. Said parameters to be changed may be the same as said measured state variables. Alternatively, the parameters may be different from said measured state variables.

The measured state variables may comprise quality (fluid composition, e.g. GVF) and/or pressure of the various output flows and/or measurements of levels of fluid within some or all of the separators and/or flow rates in the different pipes. The measured state variables may also comprise the position of the various valves within the system.

The changes to the parameters may be selected from one or more of a change to a fluid level within the primary separator and/or within the secondary separator (particularly if the secondary separator is a secondary gas separator). The changes to the fluid levels may result in changes to the positions of some or all of the valves within the system. Alternatively, the changes may be selected from a change to the positions of the valves, for example the valves on the primary separator gas outlet and/or secondary separator gas outlet and/or third separator gas outlet where one is used.

The state variables which are measurements of pressure may include outlet pressure measured on the system gas outlet, system pressure drop calculated from the difference in pressure between the pressure of the input fluid flow and the pressure at the system gas outlet and/or pressure within the primary separator.

The state variables which are measurements of quality may include feedback measurements, e.g. measurements taken from the various output flows, e.g. on the system gas outlet or system liquid outlet or measurements taken from the primary separator gas output flow or liquid output flow. Alternatively, the measurements of quality may include feedforward measurements, e.g. measurements taken on the input flow to the system or on the gas or liquid input flows to the secondary separator(s).

Where the system comprises a secondary liquid separator, the measurements of pressure may include a measurement of the differential pressure (i.e. pressure drop) across a valve on the second separator gas output flow. The differential pressure over the secondary liquid separator gas valve needs to be high enough to enable gas flow. Where two secondary separators are used and the secondary separators are connected by one or more internal connector(s), the measurements of pressure may also include the pressure drop across valve(s) on the internal connector(s).

Said control system may be configured to regulate flow by controlling said primary separator gas outlet valve primarily based on a function of the pressure on said primary separator gas outlet valve, i.e. based on a function of the pressure within said primary separator. In this way, the control system can ensure that the pressure is sufficiently high for gas to flow through the system gas outlet. Said primary separator gas outlet valve may also be controlled based on a function of the liquid level within the primary separator and/or where a secondary gas separator is used based on a function of the pressure within said secondary gas separator.

Where a secondary liquid separator is used, said control system may be configured to regulate flow by controlling said secondary liquid separator gas outlet valve and/or said secondary liquid separator liquid outlet valve primarily based on a function of the liquid level within the primary separator. Said secondary liquid separator gas outlet valve and/or said secondary liquid separator liquid outlet valve may also be controlled based on functions of the qualities of the output flows from the appropriate separators.

Where a secondary gas separator is used, said control system may be configured to regulate flow by controlling said secondary gas separator gas outlet valve primarily based on a function of the pressure within the secondary gas separator. Said secondary gas separator gas outlet valve may also be controlled based on a function of the liquid level within the secondary gas separator and/or based on a function of the pressure within said primary separator. Said control system may be configured to regulate flow by controlling said secondary gas separator liquid outlet valve primarily based on a function of the liquid level within the secondary gas separator. Said secondary gas separator liquid outlet valve may also be controlled based on a function of the qualities of the output flows from the secondary gas separator.

Said control system may be configured to regulate flow by controlling said primary separator gas outlet valve based on a model which combines any or all of a function of the pressure on said primary separator gas outlet valve, a function of differential pressure of said secondary separator gas outlet valve and a function of the position of said secondary separator gas outlet valve.

Said control system may be configured to control said secondary separator gas outlet valve based on based on a model which combines any or all of a function of the quality of the primary separator liquid output flow, a function of the quality of one or both of the secondary separator liquid output flow and the secondary separator gas output flow and a function of a ratio of the flow through said secondary separator liquid outlet valve relative to said secondary separator gas outlet valve. The model may combine the functions by multiplication and/or summation.

The system may further comprise a liquid-liquid separator downstream from the secondary separator. Such a liquid-liquid separator may be designed to separate oil and water and is preferably an inline separator. The system may also further comprise a sand removal separator upstream the primary separator, alternatively downstream from the secondary liquid separator or downstream from the liquid-liquid separator. The sand removal separator is preferably an inline separator.

The invention further provides processor control code to implement the above-described systems and methods, for example on a general purpose computer system or on a digital signal processor (DSP). The code is provided on a physical data carrier such as a disk, CD- or DVD-ROM, programmed memory such as non-volatile memory (eg Flash) or read-only memory (Firmware). Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

BRIEF DESCRIPTION OF THE DRAWINGS

The invention is diagrammatically illustrated, by way of example, in the accompanying drawings, in which.

DETAILED DESCRIPTION OF THE DRAWINGS

Figure 2:
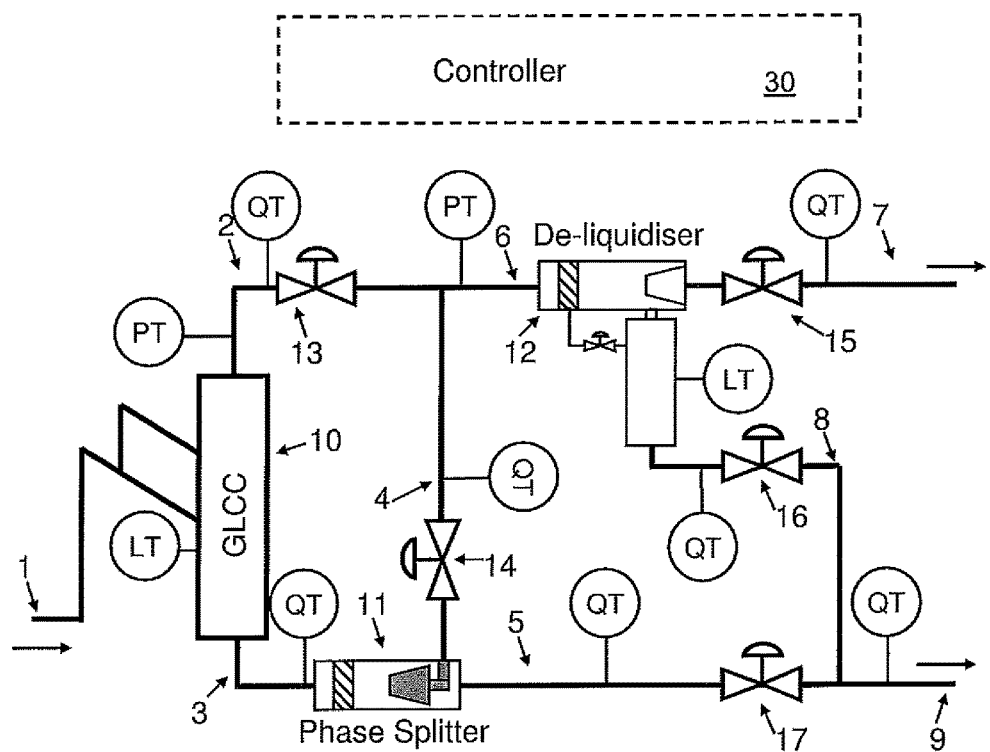
FIG. 2 is a schematic block diagram of a stand-alone system comprising a plurality of separators and a controller.

A process diagram of the system is shown in FIG. 2. The system comprises three interconnected separation units (10, 11, 12), a plurality of control valves (13, 14, 15, 16, 17) controlling gas or liquid flow through the system, a fluid inlet (1), a liquid outlet (9) and a gas outlet (7). The separation unit comprise an primary separator (10), a phase splitter (11) and a deliquidiser (12) and all described in more detail below. Gas with some liquid flows from the primary separator (10) to the deliquidiser (12) for gas polishing through pipe (2) and then to downstream process equipment through pipe (7). Liquid flows through pipe (3) from the primary separator (10) to the phase splitter (11) for liquid polishing and then to downstream process equipment through pipe (9). Gas flow with some liquid from the phase splitter (11) may be routed to the deliquidiser via pipes (4, 6). Liquid is output from the deliquidiser via pipe (8) and combined with the liquid stream from the phase splitter.

Figure 3:
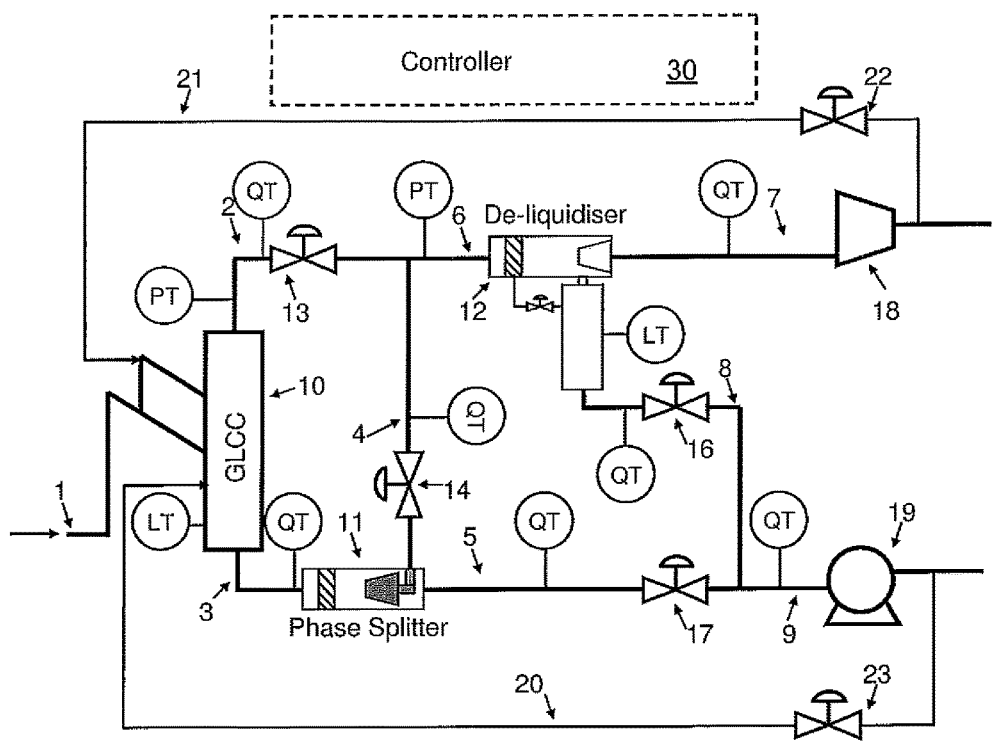
FIG. 3 is a schematic block diagram of a system similar to that of FIG. 2 incorporated in a boosting unit.
Figure 4:
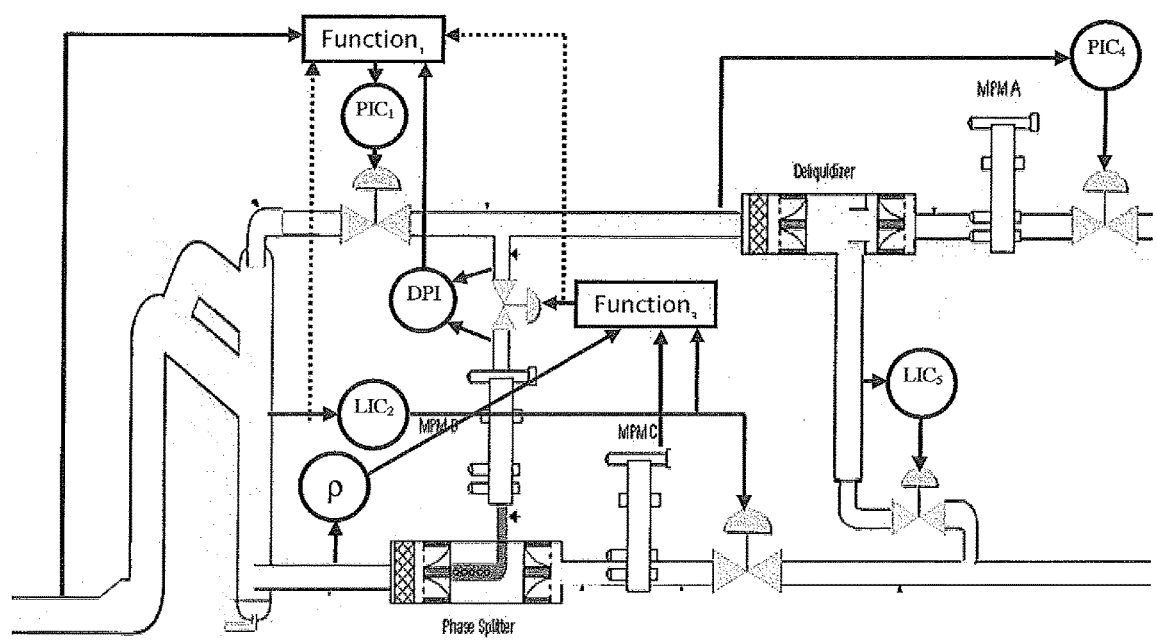
FIG. 4 is a schematic diagram of the system of FIG. 2 within a pipeline system with the control loops used for basic control.

The system used as an integrated separator in a boosting unit is shown in FIG. 3. In a system as described in FIG. 3, the liquid recycle flow line (20) can be routed at various positions depending on desired function; to the liquid outlet (9) when there is minimum flow as described below, to the GLCC (10) or back to the fluid inlet (1). The gas recycle flow line (21) can routed at various positions depending on desired function; to the gas outlet (7) to provide an anti-surge function, or to at some position upstream the gas outlet of the GLCC (10). A Process flow diagram for the integrated system test skid is shown in FIG. 4.

In each arrangement, at full capacity and a certain turndown, the primary separator (10) will function as a pre-separation stage and a slug damper. During the initial phase of a start-up and at low production rates, below the turndown range of the phase splitter (11) and de-liquidiser (12), the primary separator (10) will perform a single-stage cyclonic separation and the phase splitter and de-liquidiser will act as pipe spools, i.e. the fluid passes through the phase splitter and de-liquidiser without any further separation. At the lowest flow rates where the spin in the primary separator breaks down, the primary separator will act as a single-stage gravity separator, and the downstream inline units (11,12) will also then function as pipe spools. In such cases, the secondary stream control valves (14, 16) from the phase splitter and de-liquidiser will be closed. During normal operation, the secondary separation stages (11,12) will polish the liquid dominated stream from the liquid outlet of the primary separator, and polish the gas dominated stream from the gas outlet of the primary separator. In a system with boosting compressor and/or pump, minimum flow/anti-surge lines are integral parts of the technology.

Figure 7:
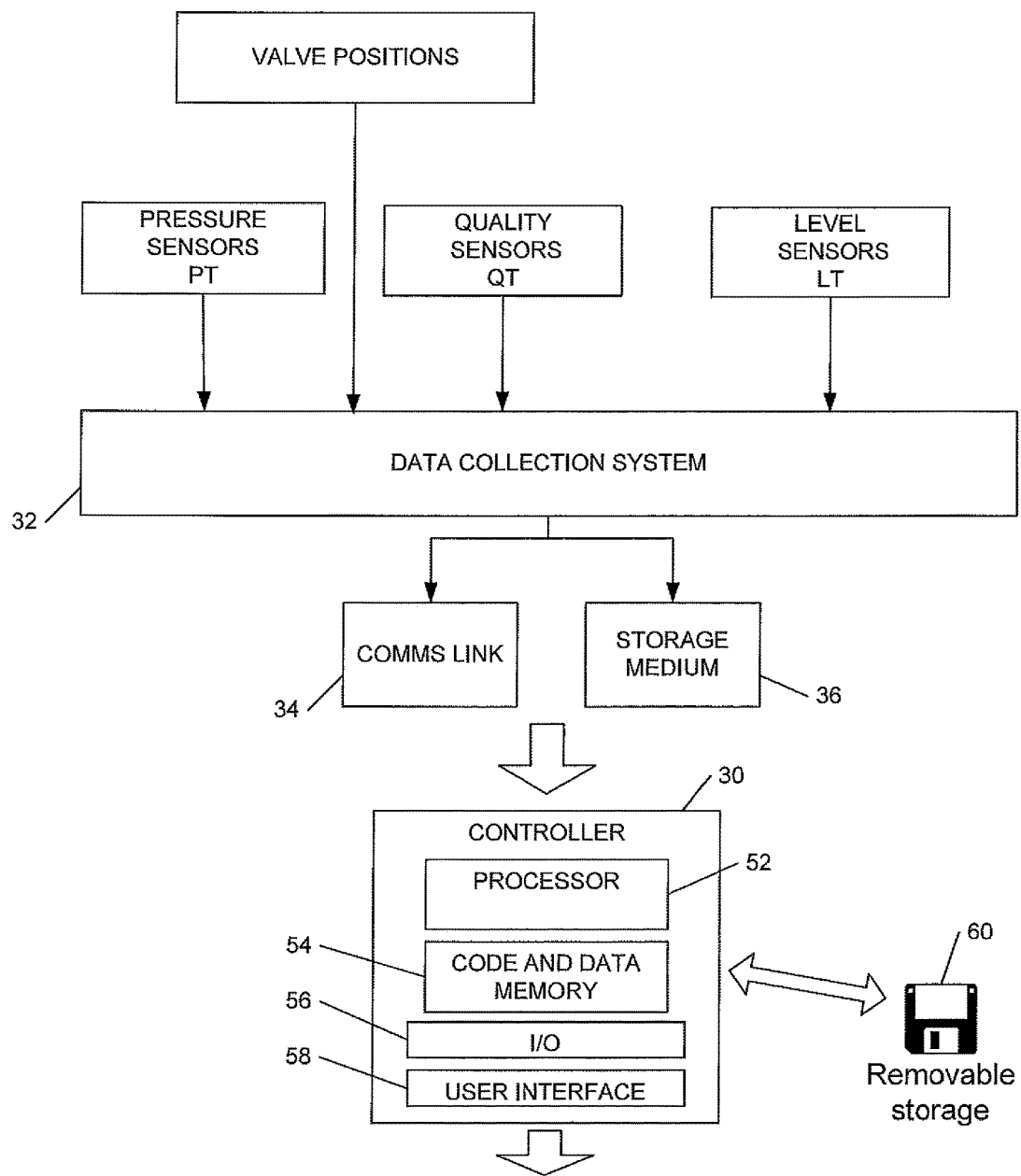
FIG. 7 is a schematic block diagram of the controller and associated components of the system of FIGS. 2 to 4.

The separation system can be controlled using traditional per separation unit PID controllers with manual setting of controller parameters. Alternatively, linear or non-linear Model Predictive Control can be used to predict optimal controller settings every one to ten seconds. The process is a multi-variable process and for a plurality of the control loops there is no one-to-one relationship between state variables and control valves. The valves are controlled by a controller (30) which receives data from a plurality of sensors (Level Transmitters (LT), Pressure Transmitters (PT) and Quality Transmitters (QT)) throughout the system. For simplicity, all the connections are omitted from FIGS. 2 and 3 with some connections being shown in FIG. 4. The controller (30) and associated components are shown in FIG. 7. As shown, the plurality of sensors each provide information to a data collection system (32). Information on the position of the various valves within the system is also provided to the data collection system (32). The information from the sensors and/or valves may be collected periodically, e.g. at regular intervals, or in response to demand by a user. The information collected by the data collection system (32) may be sent via a communication link (34) to the controller (30) and/or stored in a storage system (36).

The controller (30) comprises a processor (52) which implements the methods and processes described below. These methods and processes may be stored as program code in the code and data memory (54) of the controller (30) and/or may be stored on removable storage (60) insertable into the controller (30). The controller (30) also comprises an input/output bus (56) connecting the various components and a user interface (58). The user interface (58) allows a user to review data output from the system, e.g. recommendations for changes and/or to input requests for data into the system. It will be appreciated that whilst the controller and data collection unit are shown as separate components, their functionalities may be integrated into one device.

The purpose of the separation system is to perform separation of a well stream, primarily gas-liquid separation during startup, shut-down, transient inflow and stable production. The main intention is to produce separate gas and liquid flows, such as to enable either pipeline transport of a gas stream and a liquid stream, with or without boosting device on one or both outlet streams. The quality requirements of the outlet flows, i.e. to which extent the liquid is present in the gas flow and vice versa, will depend on application.

Primary Separator—GLCC

Each embodiment has an primary separator which may be a Gas Liquid Cylindrical Cyclone (GLCC) (10). In the following description, the term GLCC is used interchangeably with the term primary separator. This is an inline, piping code, cyclonic compact separator utilizing modifications of the inlet piping of a vertical separator to maintain or improve performance while dramatically reducing the size and weight with respect to conventional gravity separation. The GLCC is a low retention time separator with retention times in the range of few seconds.

Figure 1A:
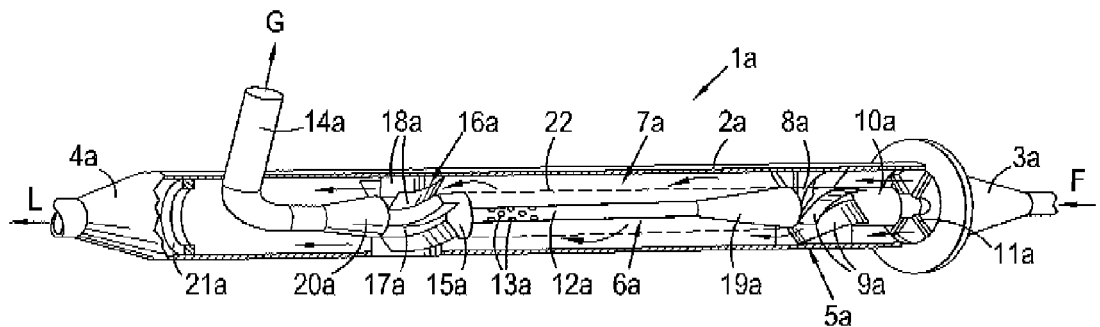
FIG. 1a is a compact inline phase splitter as taught in WO 01/00296.
Figure 1B:
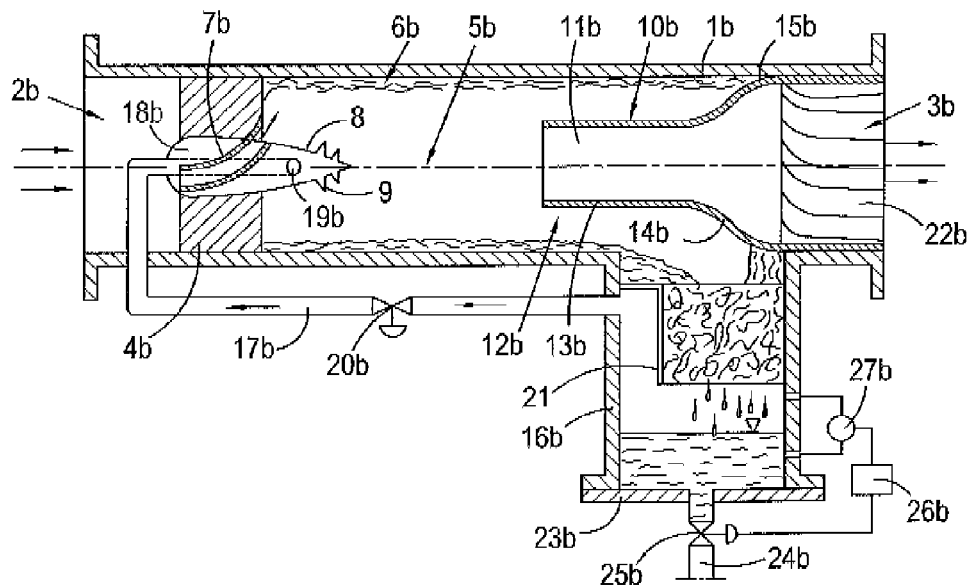
FIG. 1b is a compact inline deliquidiser as taught in WO 2002/056999.
Figure 1C:
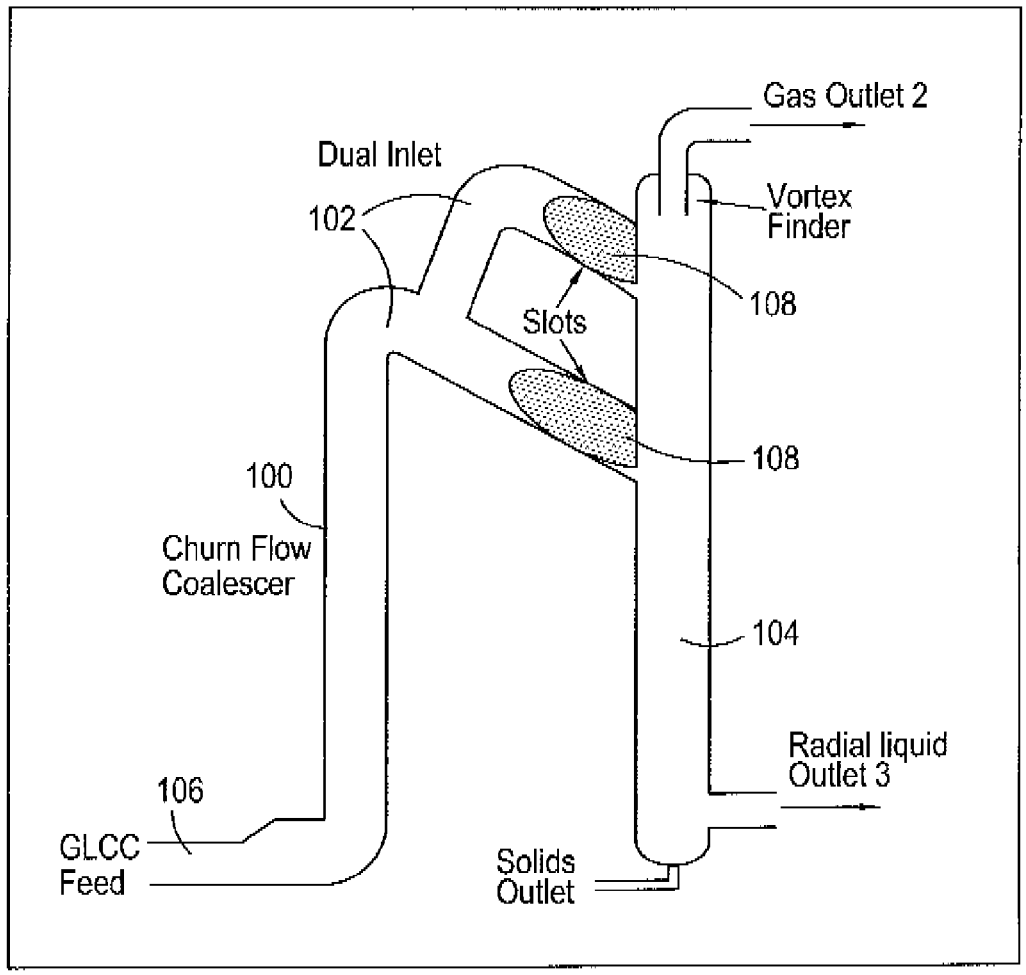
FIG. 1c is a GLCC—Gas Liquid Cylindrical Cyclone.

An example of a suitable GLCC is shown in FIG. 1c. The example GLCC includes an inlet pipe (106) which flows into an upward vertical churn flow coalescer with larger diameter than the inlet pipe (100), and downwardly sloped tangential inlet pipe (102) which develops stratified flow into the separator body (104). The GLCC may alternatively include two inlet pipes (102), where the upper pipe allows gas to escape into the separator body if the lower inlet pipe is fully or partially blocked by liquid. The dual inlet such as the one shown in FIG. 1c may improve slug flow performance. An internal diverter plate (108) is often used to create a cyclonic flow of moderate g-force at the inlets of the vertical separator body by directing the feed around the GLCC body wall. The diverter plate creates a partial blockage of the inlet piping. The area of the inlet pipe that is not blocked by the plate is referred to as the inlet slot.

The GLCC is designed to provide a rough, partial separation to produce a predominantly gas stream (2) and a predominantly liquid stream (3), and dampen incoming flow transients. At such conditions, the GLCC will intentionally create significant liquid carry over and gas carry under. At flow rates below efficient operation of the downstream polishing separators (11, 12), the liquid and gas streams out of the GLCC shall alone meet the requirements of any downstream transport pipeline or process unit such as booster pump (19) and/or gas compressor (18). There may also be solids outlet at the base of the separator body (104).

If wavy flow, surge flow or hydrodynamic slug flow occurs, the GLCC together with an active, fast and accurate control system will act as a flow conditioning process unit and provide stable flow into the downstream inline separator units.

Secondary Liquid Stream Separator—Phase Splitter

Each embodiment also shows a secondary liquid separation stage in the form of a phase splitter, although this may not always be required. The secondary liquid separation stage may comprise a phase splitter located downstream the GLCC's liquid outlet (3). In the following description, the term phase splitter is used interchangeably with the term secondary liquid separator. The phase splitter will receive a primarily liquid flow with gas carry under from the GLCC. The phase splitter (11) is an inline, piping code, cyclonic separation device. It may be a phase splitter (11) such as the unit covered by patent WO01/00296 and shown in FIG. 1a (prior art) but with a deliquidiser (12) replacing the control scrubber on the gas outlet (4).

The liquid outlet stream (5) from the phase splitter shall meet the requirements of any downstream transport pipeline (9) or process unit such as a booster pump (19) (multiphase pump, hybrid/gas tolerant pump, or conventional liquid pump). As shown, the gas from the phase splitter is routed (4, 6) to the deliquidiser (12) for polishing, although it may be routed to the gas outlet if there is no secondary gas stream separator. The secondary liquid stream separator is controlled based on measurement of the outlet liquid quality and actuated using the control valve on the gas outlet (14).

Secondary gas stream separator—deliquidiser

Each embodiment also shows a secondary gas separation stage in the form of a deliquidiser, although this may not always be required. In the following description, the term phase splitter is used interchangeably with the term secondary gas separator. The secondary gas separation stage is located downstream from the GLCC gas outlet and is designed to receive through pipe (6) a primarily gas flow with liquid carry over from the gas outlet of the GLCC (2). If a phase splitter is used, the secondary gas separation stage is also downstream from the gas outlet from the secondary liquid stream separator and receives a primarily gas flow therefrom via an internal cross-stream pipe (4).

The deliquidiser is an inline, piping code, cyclonic separator. The separator may comprise a primary separation chamber and a secondary liquid boot to remove entrained gas from the separated liquid. The deliquidiser may include a gas recycle line installed from the liquid boot and into the centre of the deliquidiser primary separation chamber. The recycle line may or may not be equipped with a control or on/off valve. The deliquidiser (12) may be one such as shown in WO2002/056999.

The gas outlet stream (7) from the deliquidiser shall meet the requirements of any downstream transport pipeline or process unit such as a wet-gas compressor (18). The liquid outlet stream (8) from the deliquidiser should meet the same requirements as the liquid stream (5) from the phase splitter. The liquid quality requirements in the liquid outlet stream (8) from the deliquidiser may be relaxed if the liquid stream coming from the deliquidiser is small compared to that coming from the phase splitter.

Alternative System Layouts

In the embodiments described above, the system comprises three inline separation devices. Alternative embodiments may comprise sub-systems of these depicted embodiments, for example;

i) The system may comprise a GLCC as primary separator and a secondary separator in the form of a de-liquidiser. Accordingly, the system is the same as that shown FIG. 2 but with the phase splitter removed and the internal connector (4) between the phase splitter and de-liquidiser removed. Accordingly, the same numbering as FIG. 2 is used. In this two separator arrangement, the multiphase flow is routed into the GLCC (1) for partial separation of gas and full separation of the liquid. The gas stream from the GLCC is routed through (2, 6) and polished in the de-liquidiser. In this system, the GLCC provides sufficient liquid quality in the entire operation range. The liquid streams from the GLCC (3) and de-liquidiser (8) may then be routed directly to downstream process equipment (9), such as a boosting pump, a pipe line or an oil/water separator device.

ii) The system may comprise a phase splitter (11) as an primary separator and a de-liquidiser (12) as a secondary separator. Accordingly, the system is the same as that shown FIG. 2 but with the GLCC removed and the input flow (1) entering the phase splitter. Accordingly, the same numbering as FIG. 2 is used. The multiphase flow is routed directly into the phase splitter (11) for partial separation of gas and full separation of the liquid. The gas stream from the phase splitter is routed through (4, 6) and polished in the de-liquidiser (12). In this system, the phase splitter provides sufficient liquid quality in the entire operation range. The liquid streams from the phase splitter (5) and de-liquidiser (8) may then be routed directly to downstream process equipment (9), such as a boosting pump, a pipe line or an oil/water separator device.

In all of the embodiments described above, the liquid outlet stream (9) may consist of two liquid phases, predominantly oil and water, and may be routed to an oil/water separation unit.

The liquid stream may be routed to a sand removal device. Alternatively, if the liquid has been separated into oil and water streams, either of the two liquid streams may be routed to sand removal devices.

Control System

The system can be controlled by using only basic control loops (as shown in FIG. 4) or a combination of basic control loops and Model Predictive Control (MPC). The objective of the control systems is to obtain a sufficiently clean gas in the gas outlet (7) and a sufficiently clean liquid in the liquid outlet (9). The quality requirements of the gas and the liquid are given by the downstream transport pipe requirements, i.e. to avoid liquid accumulation and comply with inhibitor distribution requirements, or the downstream process equipment, i.e. pump and gas compressor or wet gas compressor. To obtain the optimum separation degree for the total system the different components need to be controlled within their operating envelope and thereafter optimized to obtain the best separation degree possible of the separation system under the given operating conditions.

The first objective of the control system is to obtain a stable process, which is done by controlling the liquid level of the GLCC (10) and the deliquidizer (12). The level control loops are shown in FIG. 4 (LIC2 and LIC5). The second objective is the separation performance optimisation. Optimal operation of the system is performed by measuring all relevant state variables, and thereby manipulates the available actuators. The control algorithm used to optimize the process can be of different types. Two possible algorithms are MPC (e.g. as taught in WO01/67189) and custom basic control with additional logic. Both solutions can give approximately the same optimal operating point, depending on implementation and control parameters. Other control algorithms which can be used to control this system are optimal control and adaptive control. The control system for this system can be a combination of MPC, basic control, logic, optimal control and adaptive control.

The actuators (valves and pump/compressor) of the system are used to manipulate the controlled state variables of the process. The valve on the GLCC gas outlet (2) is used to enable gas flow from the phase splitter (11) (pressure balance at location (4)). The valve on the phase splitter liquid outlet (5) is used to enable liquid flow from the deliquidiser (12) (pressure balance at location (8)).

As set out above, various sensors (QT, PT, LT) are positioned throughout the system to measure various state variables (or parameters). Changes in some or all of these state variables are generally in response to changes in the primary disturbance state variables which include the quality of the liquid output from the GLCC through pipe (3), the quality of the fluid input and the flow of the fluid into the GLCC through fluid inlet (1). The state variables which are measured by the system include quality measurements from the QT sensors on the various flow lines, pressure measurements from the PT sensors on the various flow lines and liquid level measurements from the LT sensors within the primary or secondary separators. The other state variables determined by the system are the position of each valve within the system. By position of each valve, it is meant whether or not the valve is open, closed or partially closed.

The primary quality measurements used by the control system may include some or all of a GVF measurement taken on the system gas outlet (7) (the deliquidiser gas outlet where a deliquidiser is used), a GVF measurement taken on the deliquidiser liquid outlet flow (8), a GVF measurement taken on the phase splitter liquid outlet flow (5) and a GVF measurement taken on the GLCC liquid outlet flow (3). Additionally, quality measurements may also include a GVF measurement taken on the GLCC gas outlet flow (2), a GVF measurement taken on the system liquid outlet (9) (also the phase-splitter liquid outlet), and a GVF measurement taken on the internal cross-stream pipe (4) from the phase splitter gas outlet flow to the de-liquidiser.

The primary pressure measurements used by the control system may include some or all of outlet pressure measured on the system gas outlet (7), system pressure drop calculated from the difference in pressure from the system inlet to the system gas outlet (1,7), and the pressure drop across the valve (14) on the internal cross-stream pipe (4) from the phase splitter gas outlet flow to the de-liquidiser.

Other state variables which may be controlled are the positions of the valve (17) on the phase-splitter liquid level output, the position of the valve (16) on the deliquidiser liquid level output and the position of the valve (14) on the internal cross-stream pipe (4) from the phase splitter gas outlet flow to the de-liquidiser.

Figure 5:
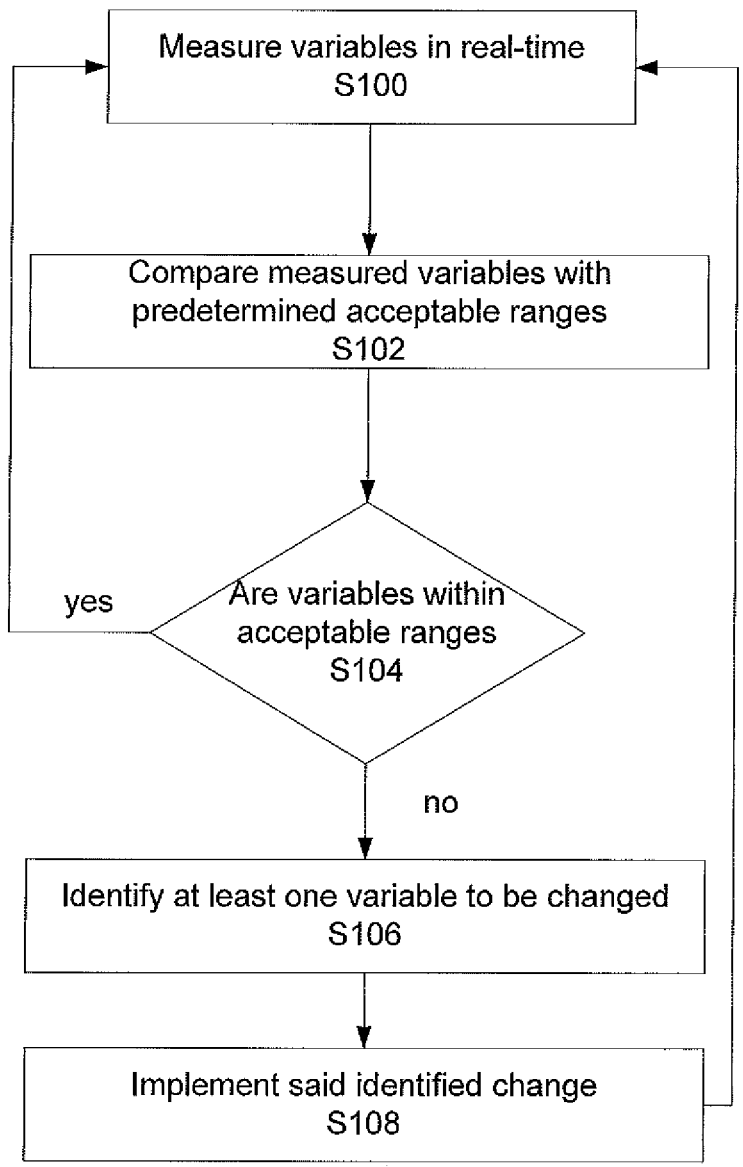
FIG. 5 is a flowchart of the general process implemented by the controller of FIGS. 2 to 4.

A flow chart of the method is set out in FIG. 5. The first step is to measure in real-time the various input state variable (step S100). The system then compares the measurements with predetermined acceptable ranges for the state variables (step S102). The system determines whether or not these measurements are inline with the system requirements (Step S104). If the system requirements are being met, no changes are made and the method loops back to the measurement stage.

Alternatively, if the system requirements are not being met, the system may identify at least one state variable to be changed within the system to attempt to bring the system back into line (step S106). The change is then implemented at step S108 and the system loops back to the initial measurement step to repeat the process.

In the FIG. 2 embodiment, the state variable identified at step S106, primarily include one or more of the set point for fluid within the GLCC (10), the set point for liquid within the deliquidiser (12) and/or the positions of the valve (15) on the deliquidiser gas outlet, the valve (14) on the phase splitter gas outlet and the valve (13) on the GLCC gas outlet. In the FIG. 3 embodiment, the system manipulates the same state variables as in FIG. 2 together with compressor speed (18), the position of the anti surge valve (22), pump speed (19) and the position of the minimum flow valve (23).

Whether or not to open or close one of the valves may be determined by considering some or all of the various state variables which are being measured/determined. For each valve there may be a primary state variable and whether or not that state variable meets the system requirements is the main factor in selecting the appropriate position of that valve. There may also be additional state variables which are also considered. The table below sets out the primary and other state variables for each valve.

| Valve | Primary state variable | Other state variable(s) |
|---|---|---|
| GLCC, gas outlet | GLCC, pressure | GLCC, level deliquidiser, pressure |
| phase splitter, gas outlet | GLCC, level | GLCC & phase splitter, outlet qualities |
| phase splitter, liquid outlet | GLCC, level | GLCC & phase splitter, outlet qualities |
| deliquidiser, gas outlet | deliquidiser, pressure | deliquidiser, boot level GLCC, pressure |
| deliquidiser, liquid outlet | deliquidiser, boot level | deliquidiser, outlet qualities |

Figure 6:
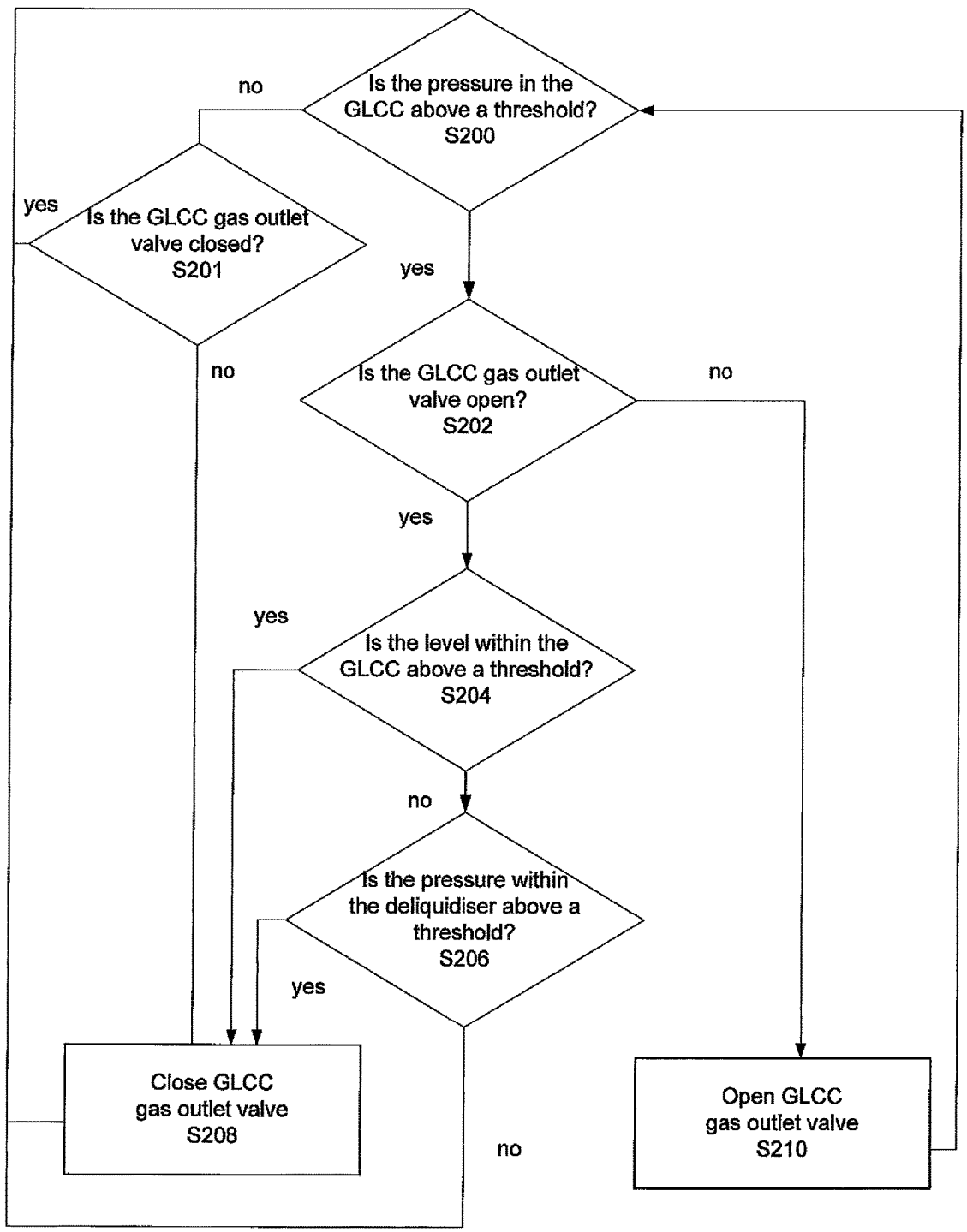
FIG. 6 is a flowchart of the process implemented by the controller with reference to a valve in the system of FIGS. 2 to 4.

FIG. 6 illustrates how the measurement of the primary and other state variables may be used to select the position of the gas outlet valve for the primary separator (GLCC). The main purpose of the GLCC gas outlet valve (2) is to enable gas flow from gas outlet (9). Where a secondary gas separator (phase splitter) is used, the main purpose of the GLCC gas outlet valve (2) is to enable gas flow through the phase splitter gas outlet. In this case, this could be achieved by controlling the differential pressure over the phase splitter gas valve and thus the primary state variable is the pressure of the GLCC. This is also the primary state variable where there is no secondary gas separator.

At step S200, the controller determines whether or not the pressure in the GLCC is above a threshold. This threshold should be sufficiently high, e.g. to ensure that the differential pressure over the phase splitter gas valve is high enough to enable gas flow. If the pressure is not above the threshold, the controller determines whether or not the GLCC gas outlet valve is closed (step S201). If it is closed, the controller loops back to the original step S200 to repeat the process. If the valve is open, the valve is closed (Step S208) and the controller loops back to the original step S200 to repeat the process.

If the pressure is above the threshold, the controller determines whether or not the GLCC gas outlet valve is open (step S202). If the valve is closed, the valve is opened (S210) to allow gas to flow and the process loops back to the beginning. If the valve is open, the controller then passes to a consideration of the other state variables, e.g. whether or not the level within the GLCC is above a threshold (step S204). By consideration of this state variable, the GLCC gas outlet valve may be used to prevent liquid flooding into the deliquidiser. For such cases, the gas outlet valve of the GLCC is closed when the level is higher than a specified limit (step S208).

If the level and pressure are OK, the controller considers the pressure within the deliquidiser (step S206), if one is used. If the pressure is below the threshold, the process loops back to the beginning with the valve open. Otherwise, the valve is closed (S208) and the process loops back to the beginning.

A similar process could be implemented for each of the other valves with their primary and other state variables as set out in the table above.

As set out above, the pressure within the primary inline separator (GLCC) is the main factor. The following table gives a selection of models which are used for controlling the position of the GLCC gas outlet valve. For each model, the control is based on a function of some or all of the state variables: pressure within GLCC, differential pressure across phase splitter gas valve, position of phase splitter gas valve, level within GLCC.

| No | Input | Description |
|---|---|---|
| 1 | $z_{GLCC, Gas}$ = PID(Press$_{GLCC}$) | Model using a function of pressure within GLCC |
| 2 | $z_{GLCC, Gas}$ = PID(DP$_{PS\_Gas\_Valve}$) | Model using a function of differential pressure across phase splitter gas valve |
| 3 | $z_{GLCC, Gas}$ = PID($z_{PS, Gas}$) | Model using a function of position of phase splitter gas valve |
| 4 | $z_{GLCC, Gas}$ = combination of 1, 2, 3 | Model combining functions 1 to 3 |
| 5 | $z_{GLCC, Gas}$ = combination of 1, 2, and 3 and GLCC level | Model combining model 4 with level within GLCC |

$z_{GLCC, Gas}$: Choke position (for the GLCC gas outlet)
$z_{PS, Gas}$: Choke position (for the Phase splitter gas outlet)
Press$_{GLCC}$: GLCC pressure
DP$_{PS\_Gas\_Valve}$: Pressure drop across the phase splitter gas outlet valve
PID: Proportional + Integral + Derivative controller
(Normally PI-controllers—Proportional + Integral—were used in the control loops)

There are advantages and disadvantages to each of the models 1 to 5. For example, model 1 uses an established model which controls both the system pressure and the differential pressure. The model is also easy to tune, i.e. it is possible to adjust the thresholds or other boundaries for each measured state variable which indicate whether or not the system is within operational range. However, using model 1 may lead to a problem with the phase splitter gas outlet flow. By contrast, the models for 2 to 5 are less well-established and thus there may be problems with tuning the models. Model 2 offers the advantage that it enables flow through the phase splitter gas outlet but may have problems with controller tuning. Model 3 offers the advantage that it ensures that the gas outlet valve is in the operational range but may have problems associated with closing the valve. Both models 4 and 5 offer flexibility but as set out above there may be problems with tuning.

As a further example, the control of one other valve, namely the phase splitter gas outlet valve is described in more detail below and indicated as Function 3 in FIG. 4. The main purpose of this valve is to ensure that both phase splitter outlets are controlled so that the GLCC level is controlled and that both phase splitter outlets have the acceptable qualities. The following table gives a selection of models which are used for controlling the position of the phase splitter gas outlet valve. For each model, the control is based on a function of some or all of the state variables: position of phase splitter gas outlet valve relative to phase splitter liquid outlet valve, level within GLCC, GVF of the GLCC liquid outlet (feedforward control), GVF of the gas from phase splitter gas outlet, GVF of the liquid from phase splitter liquid outlet.

| No | Equation | Description |
|---|---|---|
| 1 | $z_{PS, Gas}$ = PID(GVF$_{PS, Liq}$) | Feedforward model using a function of the quality of the liquid from the phase splitter |
| 2 | $z_{PS, Gas}$ = A $z_{PS, Liq}$ + PID(GVF$_{PS, Liq}$) | Feedforward model summing (1) with a function of ratio control |
| 3 | $z_{PS, Gas}$ = A PID(GVF$_{PS, Liq}$) $z_{PS, Liq}$ | Feedforward model multiplying (1) with a function of ratio control |
| 4 | $z_{PS, Gas}$ = A GVF(rho$_{Inlet}$) $z_{PS, Liq}$ + PID(GVF$_{PS, Liq}$) | Model (1) summed with model (3) in which feed forward is replaced with a feedback function of quality at the inlet |
| 5 | $z_{PS, Gas}$ = A GVF(rho$_{Inlet}$) PID(GVF$_{PS, Liq}$) $z_{PS, Liq}$ | Model (3) multiplied by a feedback function of quality at the inlet |
| 6 | $z_{PS, Gas}$ = (A GVF(rho$_{Inlet}$) + B GVF$_{PS, Liq}$ + C GVF$_{PS, Gas}$) $z_{PS, Liq}$ | Summation of a feedback function of quality at the inlet with feed forward functions of quality at both gas and liquid outlets. |

$z_{PS, Gas}$: Choke position for the Phase splitter gas outlet
$z_{PS, Liq}$: Choke position for the Phase splitter liquid outlet
GVF(rho$_{Inlet}$): quality measurement (Gas Volume Fraction) of Phase splitter inlet
GVF$_{PS, Liq}$: quality measurement (Gas Volume Fraction) of Phase splitter liquid outlet
GVF$_{PS, Gas}$: quality measurement (Gas Volume Fraction) of Phase splitter gas outlet
A, B, C: Adjustable (tunable) parameters that might be calculated based on flow etc
PID: Proportional + Integral + Derivative controller function
(Normally PI-controllers—Proportional + Integral—were used in the control loops)

There are advantages and disadvantages to each of the models 1 to 6. For example, model 1 is the simplest model but may have slow control both for valve and quality adjustment. Model 2 also may suffer from slow control in terms of slow valve closing but offers fast feed forward control to adjust quality. However, for both models 1 and 2 there is no established model and there may be problems with tuning the models. By contrast, for each of models 3 to 5, there is an established model which is also easy to tune. These models also control both the overall system pressure and differential pressure. However, there are non-linearities associated with each model which may make tuning difficult.

As shown above, models 2 to 6 use a function of $z_{Liquid}$. This may be termed a function of ratio control because the phase splitter gas outlet valve is operated according to the phase splitter liquid outlet valve. With ratio control, the controller manipulates the ratio between the two outlet valves. For example, both valves close when the GLCC level is low and open when the GLCC level is high.

Models 1 to 5 use a function of GVF$_{LiquidMPM}$, namely the quality of the liquid exiting the phase splitter. Accordingly, these models use feedback control. Model 6 uses functions of both GVF$_{Liq}$ and GVF$_{Gas}$ and thus uses feedback control from both of the phase splitter outlets. These measurements may be used to ensure that the quality of the outputs from the system meets the requirements. These measurements may also be combined with ratio control of the two valves to ensure that the qualities are according to the specifications.

Models 4 to 6 use a function of GVF(rho$_{Liq,In}$), namely the quality of the liquid exiting the GLCC and entering the phase splitter and which is calculated from the density measurement. Accordingly, these models use feedforward control. Against this may normally be achieved by manipulating the ratio between the two outlet valves.

Figure 8:
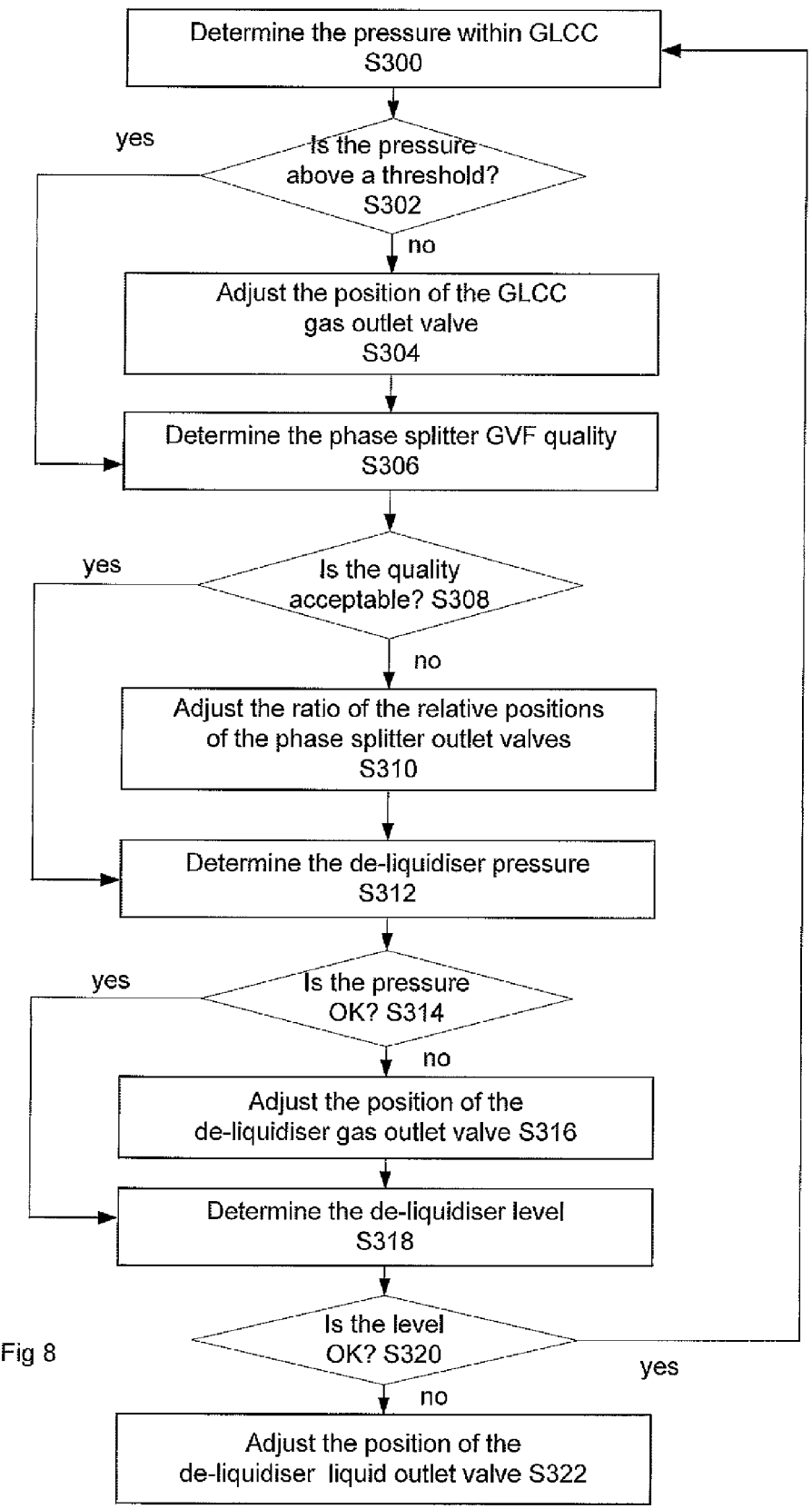
FIG. 8 is a flowchart of one example control process implemented by the controller.

Control Example:

FIG. 8 illustrates how one of the models above can be implemented. At step S300, the pressure within the GLCC is measured. The PI controller determines whether or not the measured pressure is above an acceptable threshold (Step S302). The GLCC gas outlet valve is manipulated to control the GLCC pressure using the PI controller (step S304). The pressure set point should be sufficiently high to enable flow rate from the phase splitter gas outlet to the de-liquidiser inlet.

Once any adjustment to the GLCC gas outlet valve has been made, the PI-controller considers the phase splitter gas output quality (S306). If the quality is not acceptable (step S308), both phase splitter outlets are manipulated to control the GLCC liquid level (step S310). The required ratio between the valve positions is calculated from the phase splitter quality (GVF) measurement as described in equation 5 in the previous table. The phase splitter liquid outlet quality is adjusted by modifying the ratio between the valve positions to achieve the specified total liquid outlet specification.

Once any adjustment to the phase splitter outlet valves have been made, the PI-controller determines the pressure within the de-liquidiser (Step S312). The de-liquidiser gas outlet valve is manipulated to control the pressure in the unit (which should be set lower than the GLCC pressure) (steps S314, 316).

Once any adjustment to the de-liquidiser gas outlet valve has been made, the PI controller determines the level within the de-liquidiser (step S318) and the de-liquidiser liquid outlet valve is manipulated to control the level ensuring an appropriate quality of the liquid outlet flow (steps S320, 322).

The process then reiterates through all the steps again. It will be appreciated that the PI-controller is shown as sequentially considering GLCC pressure, phase splitter GVF quality and and phase splitter liquid quality. However, these steps could be undertaken simultaneously by the PI-controller.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A system for separating an input fluid flow comprising gas and liquid into separate gas and liquid flows, the system comprising:
    a gas-liquid cylindrical cyclone primary separator configured to receive said input fluid flow and to separate said input fluid flow into a primary separator liquid output flow and a primary separator gas output flow, wherein the primary separator comprises at least one downwardly sloped tangential inlet pipe and is a gravity separator at a first production rate and a cyclonic separator at a different, higher production rate, the primary separator having a primary separator gas outlet to guide the primary separator gas output flow;
    a primary separator gas output valve coupled to said primary separator gas outlet to receive said primary separator gas output flow;
    a first secondary inline separator connected downstream from said primary separator, wherein said first secondary inline separator is a secondary gas separator and is connected to said primary separator gas output valve to receive and polish said primary separator gas output flow and to separate said received primary separator gas output flow into a first secondary separator liquid output flow and a first secondary separator gas output flow;
    a second secondary inline separator connected downstream from said primary separator, wherein said second secondary inline separator is a secondary liquid separator and is connected to said primary separator to receive and polish said primary separator liquid output flow and to separate said received primary separator liquid output flow into a second secondary separator liquid output flow and a second secondary separator gas output flow;
    a system gas outlet connected to said first secondary inline separator to output a system gas output flow;
    a system liquid outlet connected to said second secondary inline separator to output a system liquid output flow; and
    a control system comprising:
        a sensor to generate measurements of liquid level within the primary, gas-liquid cylindrical cyclone separator;
        a link to convey the measurements of liquid level within the primary separator; and
        a controller coupled to the link and to the primary separator gas output valve, the controller configured to control, based on said received measurements of liquid level within the primary, gas-liquid cylindrical cyclone separator, a position of said primary separator gas output valve to prevent liquid flooding into the first secondary inline separator,
        whereby said control system is configured to regulate flow through said primary separator and said first and second secondary inline separators to ensure a flow of gas from said system gas outlet with a maximum amount of liquid carry-over and a flow of liquid from said system liquid outlet with a maximum amount of entrained gas.

2. The system according to claim 1, wherein at least one of said control system, said primary separator and said first and second secondary inline separators sis configured to regulate transient input fluid flows and ensure a positive flow of gas from said gas output and a positive flow of liquid from said liquid output.

3. The system according to claim 1, wherein at least one of said control system, said primary separator and said first and second secondary inline separators is configured to control at least one of the quality and quantity of flow in the primary separator liquid output flow and the primary separator gas output flow.

4. The system according to claim 1, wherein said control system is configured to determine whether said input fluid flow is above a threshold value and to regulate flow through the primary separator according to said determination.

5. The system according to claim 1 wherein said primary separator is configured to primarily function as a pre-separation stage and a slug damper when said input fluid flow is above a threshold flow.

6. The system according to claim 5 wherein, if said input fluid flow is determined to be below said threshold, said primary separator is configured so that said primary separator liquid output flow has less than said maximum amount of entrained gas and said primary separator gas output flow meets said specified amount of liquid carry-over.

7. The system according to claim 1, further comprising a pump downstream from the system liquid outlet.

8. The system according to claim 7, further comprising a minimum flow pipe line connected from downstream from the pump to a location upstream from the pump.

9. The system according to claim 1, further comprising a compressor downstream from said system gas outlet.

10. The system according to claim 9, further comprising an anti-surge pipe line connected from downstream from said compressor to a location upstream from said compressor.

11. The system according to claim 1, wherein said primary separator is a cyclonic separator.

12. The system according to claim 1, wherein said secondary gas separator has a retention time in the range of a fraction of a second to a few seconds.

13. The system according to claim 1, wherein said second secondary inline separator is connected to said secondary gas separator to receive and polish a liquid output flow.

14. The system according to claim 1, wherein said first secondary inline separator is connected to said secondary liquid separator to receive and polish a gas output flow.

15. The system according to claim 1, further comprising a plurality of valves which are manipulated by said control system to regulate at least one of said primary separator's output flows or said first and second secondary inline separators' output flows.

16. The system according to claim 15, wherein the control system is configured to receive measurements for a plurality of state variables within the system and stabilise flow within the system by controlling said plurality of valves based on said measurements.

17. The system according to claim 16, wherein the control system is configured to receive state variable measurements selected from the group consisting of the primary separator liquid output flow, the primary separator gas output flow, the secondary separator liquid output flow, the secondary separator gas output flow, the system gas output flow and the system liquid output flow.

18. The system according to claim 1, further comprising a liquid-liquid separator downstream from the first or second secondary inline separators.

19. The system according to claim 1, further comprising a sand removal separator upstream the primary separator or downstream from the first or second secondary inline separators.

20. The system according to claim 1, further comprising a valve on the second secondary inline separator gas output flow and said parameter to be changed is a position of said second secondary separator gas output valve.

21. A method for controlling a system for separating an input fluid flow comprising gas and liquid into separate gas and liquid flows, the system comprising:
a primary separator configured to receive said input fluid flow and to separate said input fluid flow into a primary separator liquid output flow and a primary separator gas output flow, wherein the primary separator is a gravity separator at a first production rate and cyclonic separator a different, higher production rate, wherein the primary separator is a gas-liquid cylindrical cyclone separator comprising at least one downwardly sloped tangential inlet pipe and having a primary separator gas outlet to guide the primary separator gas output flow;
a primary separator gas output valve coupled to said primary separator gas outlet, to receive said primary separator gas output flow;
a first secondary inline separator connected downstream from said primary separator, wherein said first secondary inline separator is a secondary gas separator and is connected to said primary separator gas output valve to receive said primary separator gas output flow and to separate said received primary separator gas output flow into a first secondary separator liquid output flow and a first secondary separator gas output flow;
a second secondary inline separator connected downstream from said primary separator and is connected to said primary separator to receive said primary separator liquid output flow and to separate said received primary separator liquid output flow into a second secondary separator liquid output flow and a second secondary separator gas output flow;
a system gas outlet connected to said first secondary inline separator to output a system gas output flow; and
a system liquid outlet connected to said second secondary inline separator to output a system liquid output flow;
the method comprising
regulating flow through said primary separator and said first and second secondary inline separators to ensure a positive flow of gas from said system gas outlet with a specified amount of liquid carry-over and a positive flow of liquid from said system liquid outlet with a maximum amount of entrained gas,
wherein said regulating comprises:
receiving measurements of liquid level within the primary, gas-liquid cylindrical cyclone separator, and
controlling, based on said received measurements of liquid level within the primary, gas-liquid cylindrical cyclone separator, a position of said primary separator gas output valve, said position control to prevent liquid flooding into the secondary gas separator.

22. The method according to claim 21, wherein said regulating comprises:
measuring a plurality of state variables of the system to generate a plurality of measured state variables;
identifying, using at least one of said plurality of measured state variables, at least one parameter to be changed, whereby changing said at least one parameter further regulates said flow.

23. The method according to claim 22, wherein the plurality of measured state variables comprise at least one of:
quality of at least one of the primary separator liquid output flow, the primary separator gas output flow, the secondary separator liquid output flow, the secondary separator gas output flow, the system gas output flow and the system liquid output flow,
pressure of the primary separator liquid output flow, the primary separator gas output flow, the secondary separator liquid output flow, the secondary separator gas output flow, the system gas output flow and the system liquid output flow, and
measurements of levels of fluid within some or all of the primary and first and second secondary inline separators.

24. The method according to claim 22, wherein the system further comprises a plurality of valves and the measured state variables comprise the position of the plurality of valves within the system.

25. The method according to claim 22, wherein said at least one parameter to be changed is selected from a fluid level within said primary separator or a fluid level within the first or second secondary inline separator.

26. The method according to claim 22, wherein the system further comprises a plurality of valves and said at least one parameter to be changed is a position of at least one of said plurality of valves.

27. The method according to claim 22, further comprising measuring state variables of the primary separator liquid output flow, the primary separator gas output flow, the secondary separator liquid output flow, the secondary separator gas output flow, the system gas output flow and the system liquid output flow.

28. The method according to claim 22, further comprising measuring state variables of the input fluid flow.

29. A carrier carrying processor control code which when implemented on a processor causes said processor to carry out the method of claim 21.

30. The method according to claim 21, wherein the system further comprises a second secondary separator gas valve on the second secondary inline separator gas output flow and said parameter to be changed is a position of said second secondary separator gas output valve.

* * * * *